US 11,418,960 B1

United States Patent
Hanika et al.

(10) Patent No.: US 11,418,960 B1
(45) Date of Patent: Aug. 16, 2022

(54) SECURE DEVICE PAIRING

(71) Applicant: NCR Corporation, Atlanta, GA (US)

(72) Inventors: Jiří Hanika, Suchdol (CZ); Michal Jirouš, Prague (CZ); Petr Machek, Prague (CZ); Karel Prihoda, Mnichovice (CZ); Stanislav Tvrz, Praha-Zbraslav (CZ)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/218,321

(22) Filed: Mar. 31, 2021

(51) Int. Cl.
*H04W 12/50* (2021.01)
*H04W 12/037* (2021.01)
*H04W 12/069* (2021.01)
*G06F 3/14* (2006.01)
*G06T 15/10* (2011.01)

(52) U.S. Cl.
CPC .......... *H04W 12/50* (2021.01); *G06F 3/1462* (2013.01); *G06T 15/10* (2013.01); *H04W 12/037* (2021.01); *H04W 12/069* (2021.01)

(58) Field of Classification Search
CPC . H04W 12/037; H04W 12/50; H04W 12/069; G06F 3/1462; G06T 15/10
See application file for complete search history.

(56) References Cited

U.S. PATENT DOCUMENTS

| 9,980,140 | B1 * | 5/2018 | Spencer | H04W 12/02 |
| 2018/0302226 | A1 * | 10/2018 | Heimlicher | H04L 63/061 |
| 2020/0228337 | A1 * | 7/2020 | Sumien | H04L 9/3263 |
| 2021/0250744 | A1 * | 8/2021 | Kang | H04W 76/16 |

* cited by examiner

*Primary Examiner* — Fatoumat Traore
*Assistant Examiner* — Hamid Talaminaei
(74) *Attorney, Agent, or Firm* — Schwegman, Lundberg & Woessner (57) ABSTRACT

During a pairing process between a connecting device and a server, a shared certificate is translated into a graphical scene by a validating client device of the server and the connecting device and the corresponding graphical scenes are independently displayed on each device for visual comparison by an operator of the validating client device. A validation word or code is also presented on the connecting device. When the validation word or code is correctly entered into a pairing validation interface on the client device by the operator, the server permits the connecting device to pair/connect with the server. In an embodiment, even single bit differences between the shared certificate expected by the server creates significant differences in the graphical scene depicted on the connecting device from that which is depicted on the client device.

20 Claims, 3 Drawing Sheets

SECURE DEVICE PAIRING

BACKGROUND

Network connectivity is omnipresent with the advent of wireless technologies. In fact, even the smallest of devices, which are not typically thought to be "intelligent," now include wireless connectivity capabilities that allow such devices to become part of the Internet-of-Things (IoTs).

However, with widespread connectivity, device security has become a significant problem. Many enterprises require a plethora of security procedures and checks before a device is permitted to connect to a protected server. Trust must be established between the connecting device and the server. Trust is often represented through certificates, which include digitally signed keys.

For example, some enterprises institute security-based proximity requirements against a connecting device to ensure that the device not only possesses a valid certificate but is also located within a known location of or known proximity to a validating client device of the server. Typically, this adds a human overview component during device pairing with the server to ensure that an operator can visually validate that the connecting device is attempting to pair with the server and is displaying the appropriate certificate for pairing with the server.

Frequently, this technique is used when connecting new hardware devices to the server for a first time and for ensuring that the connection does not include an active eavesdropper (also known as a Man-In-The-Middle (MITM)) present on the connection during the pairing process. The operator is displayed the expected certificate on the validating client device and manually visits the connecting device to ensure that the same certificate is also displayed on the connecting device. If the comparison is successful, the operator authorizes the connecting device to pair with the server.

A significant problem with existing security-based proximity pairing requirements is that it relies on a diligent comparison by the operator of a cognitively difficult representation of the signed certificate such as a long string of hexadecimal digits. As a result, operators have developed bad habits of only comparing a short part of the certificate or simply approving any pairing request that is received during an expected time window during which the operator was anticipating a connecting device's pairing request. This has created security concerns for enterprises because such behavior allows an attacker to passively wait until a time is expected for a new device to be paired and insert a nefarious software program as a MITM between the new device and the server. Also, some attackers can pre-generate certificates and substitute these as purported new device-generated certificates (for example, a short left-hand portion of the attacker generated certificate matches a prefix of the new device-generated certificate; the attacker expecting that the operator will only check the prefix during pairing validation).

Furthermore, the existing security-based proximity pairing techniques leave no meaningful forensic or audit trace indicating the degree to which the operator actually checked the certificates. The operator may have acted as the attacker, or colluded with an attacker, to permit the MITM application during the pairing process, planning to plead a mistake rather than malice if discovered. It only takes a brief amount of time after the pairing is authorized for a MITM application to install itself on the network and create long-lasting and on-going security issues for an enterprise.

SUMMARY

In various embodiments, methods and a system for secure device pairing are presented.

According to an embodiment, a method for secure device pairing is presented. A pairing request is received from a first device attempting to connect to a server. A shared certificate between the server and the first device is obtained from the server and a graphical scene is generated based on the shared certificate. The graphical scene is provided to a second device or is generated by the second device based on the second device obtaining the shared certificate from the server. The second device is associated with validating at least a portion of the pairing request to compare the graphical scene as presented on the second device to a candidate graphical scene generated by the first device and displayed on the first device based on a copy of the shared certificate stored on the first device.

DETAILED DESCRIPTION

Figure 1:
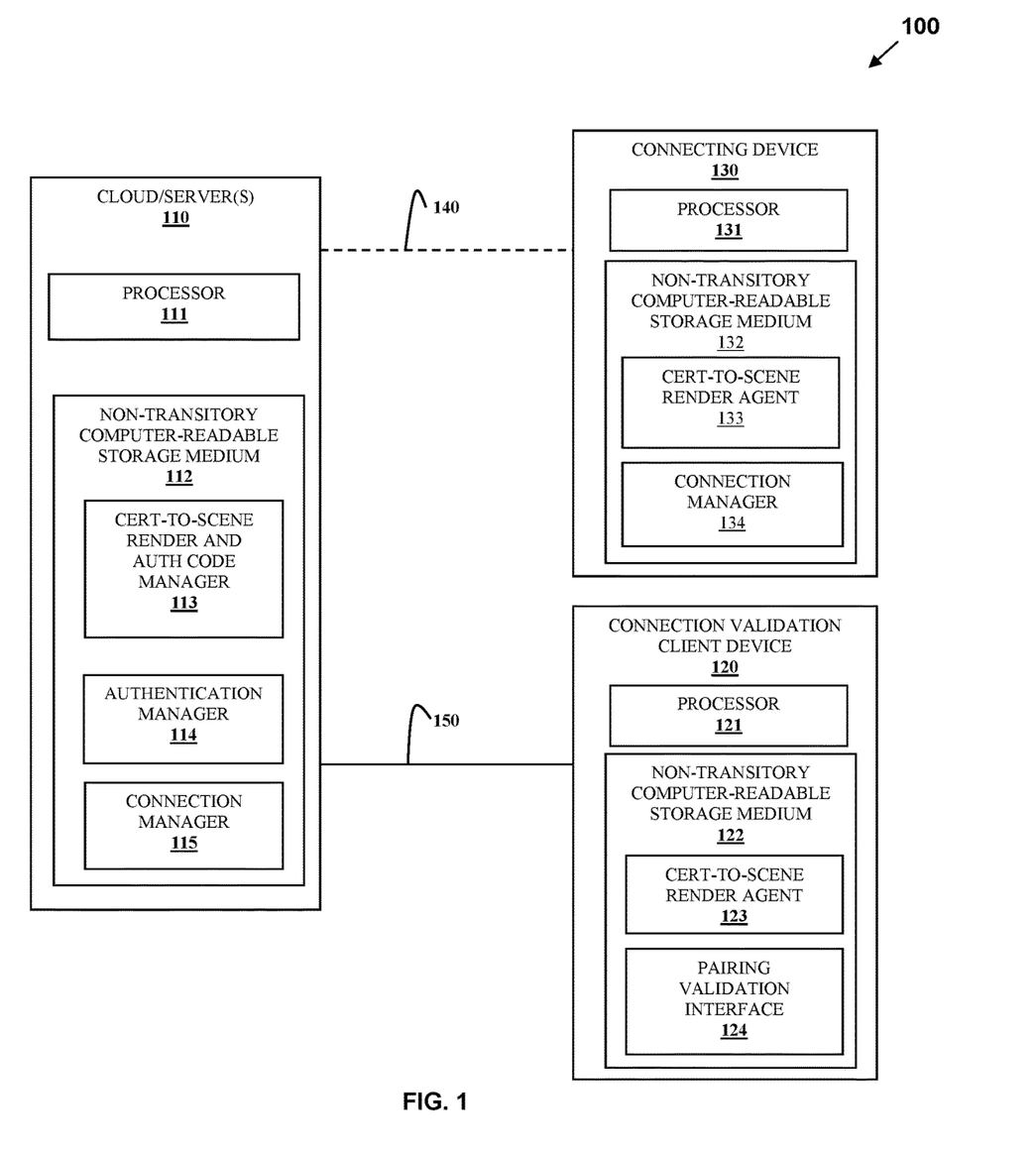
FIG. 1 is a diagram of a system for secure device pairing, according to an example embodiment.

FIG. 1 is a diagram of a system 100 for secure device pairing between two devices, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of secure device pairing between two devices, presented herein and below.

As will be demonstrated herein, system 100 provides techniques for authorizing a connecting device to pair and to connect with a server through a connection validation client device of the server or through the server itself. Any connecting device attempting to authenticate, pair, and connect with a server for a first time generates a private key and shares a shared certificate with the server, such as a public key corresponding to the private key. The connecting device translates or renders the shared certificate as a graphical scene which is displayed on the display of the connecting device along with a short, easily remembered authentication code, word, or string. The connection validation client device also renders the shared certificate into a graphical scene or receives the rendering of the shared certificate in the graphical scene from the server. The client device displays the graphical scene on a display of the client device. An operator of the client device compares the graphical scene rendered on the display of the connecting device against the graphical scene rendered on the display of the connecting device. When the graphical scenes match, the operator enters the authentication code presented on the display of the connecting device into a pairing validation interface of the client device. The server authorizes the connecting device to pair and connect with the server when the authentication code entered by the operator matches what is expected by the server. An audit trail is maintained showing that the operator visually confirmed that the two graphical scenes matched through entry of the validation code presented only on the display of the connecting device. This approach is easier than trying to validate long certification strings providing greater assurance that there is not a MITM during the pairing between the connecting device and the server. Furthermore, entry of the validation code by the operator provides non-repudiation evidence that the operator actually viewed the display of the connecting device and believed the two graphical scenes were identical.

The techniques of system 100 can be performed and implemented in a variety of embodiments, which are presented herein and below.

System 100 comprises at least one cloud/server 110, a connection validation device 120, and a connecting device 130.

It is to be noted herein and below that the role of the server may also be fulfilled by the server 110.

Cloud/server 110 comprises a processor and a non-transitory computer-readable storage medium 112. Medium 112 comprises executable instructions for a certificate (cert)-to-scene render and authentication (auth) code manager 113 (hereinafter just "manager 113"), an authentication manager 114, and a connection manager 115. When the executable instructions are executed by processor 111, this causes processor 111 to perform operations discussed herein and below with respect to 113-115. Medium 112 also comprises a shared certificate that is shared with connecting device 130 (such as a signed digital certificate). Each shared certificate of server 110 is unique to a specific connecting device 130 and is processed for validating and authenticating the connecting device 130 for pairing/connection with server 110.

Connection validation client device 120 (herein after just "client device 120") comprises at least one processor 121 and a non-transitory computer-readable storage medium 122. Medium 122 comprises executable instructions for cert-to-scene render agent 123 (herein after just "agent 123") and pairing validation interface 124. When the executable instructions are executed by processor 121, this causes processor 121 to perform operations discussed herein and below with respect to agent 123 and pairing validation interface 124.

Again, portions of or all of the functions discussed herein and below for the client device may be fulfilled by server 110.

Each connecting device 130 comprises a processor 131 and a non-transitory computer-readable storage medium 132. Medium 132 comprises executable instructions for cert-to-scene render agent 133 (hereinafter just "agent 133") and a connection manager 134. When the executable instructions are executed by processor 131, this causes processor 131 to perform operations discussed herein and below with respect to agent 133 and connection manager 134. Medium 132 also comprises a shared certificate (shared certificate corresponds to the shared certificate held by cloud/server 110 and is unique to the connecting device).

As used herein an "operator" is referred to as an individual that operates the client device 120 and visually confirms that a graphical scene presented on a display of client device 120 matches a graphical scene presented on a display of connecting device 130 during a validation of a pairing between connecting device 130 and server 110. The operator also enters a validation code into pairing validation interface 124 as evidence that the operator visually confirmed what was rendered on the display of the connecting device during the pairing validation process (note the validation code is only presented on the display of the connecting device, such that the operator would only know the validation code when the operator visually inspects the display of the connecting device As used herein the phrases "authentication code" and "validation code" may be used synonymously and interchangeably. A validation code is a short easy to remember word, string of characters, or string of digits generated by manager 113 and generated by agent 133 of connecting device 130 during initial connection negotiation and before pairing is permitted between server 110 and connecting device 130. This code has to be visually acquired by the operator from a display of connecting device 130 and then entered into pairing interface 124 of client device 120. The validation code also provides evidence to authentication manager 114 of server 110 that the operator believes a graphical scene rendered on the display of client device 120 by agent 123 matches a graphical scene rendered on the display of connecting device 130 by agent 133.

System 100 is preconfigured such that connecting device 130 has the corresponding shared certificate within medium 132 and includes agent 133. Additionally, client device 120 includes agent 123 and pairing validation interface 124. Additionally, connection 150 is a secure (encrypted) network connection that exists or is established between server 110 and client device 120. The secure network connection 150 can be wired, wireless, or a combination of wired and wireless. That is, operator of client device 120 authenticates through authentication manager 114 for establishing secure connection 150 (both the operator and client device 120 may require authentication by authentication manager 114). This establishes trust between server 110 and client device 120. Trust between server 110 and connecting device 130 is only established for a secure connection 140 between server 110 and connecting device 130 after the operator of client device 120 enters a validation code that matches what was generated by manager 113.

Once system 100 is configured and client device 120 has a secure connection 150 to server 110, a new and as of yet untrusted connecting device 130 makes a request to pair/connect with server 110. Connection manager 134 makes the request for pairing/connecting through connection manager 115. Authentication manager 114 obtains the shared certificate associated with a connecting device identifier for connecting device 130. Manager 113 passes text or a predesignated portion of the text associated with the shared certificate to a graphical scene generator which takes as input the text and generates as output a unique graphical scene, a link to the graphical scene or the graphical scene data for the graphical scene are sent by manager 113 to agent 123 over secure connection 150. Manager 113 also generates a word, string or characters (digits, text, special characters, etc.) as an authentication/validation code from a preconfigured portion of the shared certificate. The validation code is only provided by manager 113 to authentication manager 114 of server 110. The validation code is not sent over secure connection 150 to client device 120 and is not sent during connection negotiation to the connecting device 130 (rather the validation code is independently generated by agent 133 as part of the pairing validation process).

Concurrent to the above-discussed processing of server 110 and client device 120, connecting device 130 independently and separately obtains or generates a candidate graphical scene from the shared certificate stored in medium 132 on connecting device 130. Agent 133 uses text or preconfigured portion of text associated with the shared certificate to request a third-party application or to process an algorithm (same third-party application or algorithm processed by manager 113) to generate the candidate graphical scene. Agent 133 also uses a same portion or same algorithm as was used by manager 113 to generate a candidate validation code independently of manager 113. Agent 133 then presents/renders the candidate graphical scene along with the candidate validation code (placed at a predefined location or placed randomly within the scene) on a display of connecting device 130.

Pairing validation interface 124 informs the operator of client device 120 that there has been a pairing validation request received from connecting device 130 and a link is provided for the server-generated/server-obtained graphical scene. Agent 123 access the link or presents graphical scene data provided by manager 113 over secure connection 150 to cause the server graphical scene data to be presented/rendered on a display of client device 120 for visual inspection by the operator. Pairing validation interface 124 may instruct the operator to visually verify that the candidate graphical scene presented on the display of the connecting device 130 is the same as the graphical scene presented on the display of client device 120; the operator is also instructed to enter the validation code presented within the candidate graphical scene on the display of the connection device 130. Client device 120 never received the validation code generated by manager 113 over secure connection 150, such that the only way for the operator to obtain a correct validation code is by the operator visually inspecting the candidate graphical scene presented on the display of the connecting device 130.

In an embodiment, manager 113 may also provide through pairing validation interface 124 location information for connecting device 130 identified by connection manager 115 when the pairing request was received from connecting device 130 over connection 140 during authentication and connection negotiations. The location information may be mapped to a connecting device identifier for connecting device 130 or may be dynamically received from connection manager 134 during connection negotiations.

At this point, the operator has to visually inspect the display of connecting device 130 to complete the pairing validation processing. This can be done through the operator physically traveling to the location of the connecting device 130, viewing the candidate graphical scene, and noting the candidate validation code presented within the candidate graphical scene. Note that client device 120 may be a tablet, laptop, phone, or wearable processing device, such that client device 120 may accompany the operator to the location of the connecting device to complete the pairing validation processing.

In an embodiment, and when permitted by security protocols of an enterprise, a known user of connecting device 130 may establish a remote video conference with a mobile device of the known user to client device 120. The user then shows the operator the display of connecting device 130 for visual inspection during the video conference.

In an embodiment, and when permitted by security protocols of an enterprise, a known user of connecting device 130 may take a screen shot of the display for connecting device 130 and text the screen shot to the operator on client device 120 or to a mobile device of the operator for visual inspection by the operator.

In remote-based verification embodiments, authentication manager 114 may provide remote device connection and contact details to the operator for the known user and/or a mobile device of the known user.

If the operator determines differences between the graphical scene rendered on the display of client device 120 and the candidate graphical scene rendered on the display of the connecting device 130, then the pairing/connection request is denied by the operator through pairing validation interface 124. Authentication manager 114 instructs connection manager 115 to terminate the connection negotiation and deny the connection 140. The connecting device 130 is not permitted to establish a secure and trusted connection in this case as it may be evidence that there was a MITM during the connection negotiations for connection 140.

If the operator determines that the graphical scene rendered on the display of client device 120 and the candidate graphical scene rendered on the display of the connecting device 130 are the same, then the operator enters the candidate validation code presented within the candidate graphical scene into the pairing validation interface 124.

Authentication manager 114 compares the validation code generated independently by manager 113 against the operator-entered candidate validation code. When the validation code matches the entered candidate validation code, authentication manager 114 instructs connection manager 115 to authorize the pairing and establish a secure connection 140 between server 110 and connecting device 130. Connection manager 115 and connection manager 134 then complete connection negotiations and encryption details and establish secure connection 140.

Authentication manager 114 also retains a variety of information regarding the pairing validation process in an audit store or an audit train. For example, authentication manager 114 records: 1) date and time stamps for when the pairing request was received from connecting device 130 and for when the operator entered the candidate validation code into pairing validation interface 124; 2) identifiers for client device 120, connecting device 130, the operator of client device 120, any known user associated with connecting device 130, the shared certificate; 3) an indication as to whether the operator validation was performed remotely or was performed at a physical location of connecting device 130 through manual inspection; 4) location data for connecting device 130 and client device 120; 5) type of network connections being used by connecting device 130 and client device 120 to interact with server 110 (such as wireless (Bluetooth, Near Field Communication (NFC), Wi-Fi, etc.), wired Ethernet, etc.); 6) an amount of elapsed time between the pairing request and validation by the operator; 7) devices types for the connection device 130 and client device 120 (such as transaction terminal, desktop, laptop, phone, tablet, wearable processing device, etc.); 8) validation code entered by the operator and validation code generated by manager 113); etc. The audit data is retained in an audit store when pairing validations are both successful and unsuccessful. Furthermore, audit data for any successful pairing connection 140 can serve as no-reputable evidence against the operator that the operator certified that graphical scene presented on client device 120 matched the candidate graphical scene presented on the connecting device 130. This may also provide evidence when there ends up being a MITM for connection 140 that the operator was potentially complicit in the network attack on the enterprise.

In an embodiment, the connecting device 130 is a transaction terminal. The transaction terminal may be a Self-Service Terminal (SST), an Automated Teller Machine (ATM), a Point-Of-Sale (POS) terminal, or a kiosk.

In an embodiment, the connecting device 130 is a laptop, a phone, a tablet, a desktop, or a wearable processing device.

In an embodiment, the client device 120 is a management transaction terminal, a laptop, a desktop, a tablet, a phone, or a wearable processing device.

In an embodiment, a validated pairing request resulting in secure connection 140 between server 110 and connecting device 130 is wireless or wired.

In an embodiment, the techniques are used for new connecting devices 130 being brought online by an enterprise with server 110 during initial configuration and set up of the new connecting devices 130 to ensure that secure connections 140 are free of MITM attackers.

In an embodiment, the graphical scenes generated or obtained by server 110 and connecting device 130) are colorful three-dimensional (3D) scenes so that visually clearly distinct parameters of the scenes can contain sufficient (cryptographically relevant) entropy and the whole shared certificate is mapped and represented through visual objects and visual color delineations within the scenes. The 3D scenes are rendered during a pairing validation request on both the connecting device 130 and the client device 120. Agent 133 uses a same algorithm or third-party service for generating the scene as does manager 113 and/or agent 123 (that is, agent 123 in some embodiments may render or obtain the scene on its own independent of manager 113 when the shared certificate or relevant portions of the shared certificate are made available to agent 123).

In an embodiment, the validation code generated by both server 110 and connecting device 130 is three lower case characters that is generated from the lowest order three digits (letters) of positional base-26 representation of the certificate signature/fingerprint in a desired or configured alphabet. This code is extremely easy to remember and transmit.

In an embodiment, a workflow associated with the operator for a pairing validation request requires the operator to affirmatively confirm that the two graphical scenes match within the pairing validation interface before the operator is presented an entry field for entry of the candidate validation code obtained from the display of the connecting device 130.

In an embodiment, the shared certificate is rendered alongside with its equivalent graphical scene and its embedded validation code on the connecting device 130. However, the client device 120 only displays the shared certificate alongside with its graphical scene, the validation code is never rendered on the client device 120 during pairing validation workflows of system 100.

In an embodiment, the algorithm or third party service that translates the shared certificate into a graphical scene includes a large degree of entropy, such that even a single bit difference between two shared certificates will generate a large difference in the two graphical scenes, which is visually apparent to the operator with little to no attentiveness. Each bit of the shared certificate has a significant impact on the resulting scene generated by the algorithm or third-party service. This ensures, that the visual comparison is easy to perform and requires little focus of the operator and ensures that would-be attackers understand that the likelihood of reproducing a near identical scene with a modified shared certificate is nearly nil.

In an embodiment, the algorithm processed to generate the visual scenes includes at least 100 to 200 bits of entropy (scene features). The scenes generated are easily comprehended by the operators and include, by way of example only, landscapes, facial expressions, rotated objects, perspective views of objects, avatars, animated characters, animals, partially visible objects, contrastive colors, textures, and gradients, etc. The scenes are generated based on the text of the shared certificates and map to distinctive scene combinations.

In an embodiment, the shared certificate is a signed digital certificate unique to the connecting device 130.

In an embodiment, the validation code is a dictionary word selected from a dictionary based on the shared certificate from a dictionary comprising 1,000 to 30,000 distinct words. The validation code comprises 10 to 15 bits of additional entropy in addition to the 100 to 200 bits of the generated scene. The word is easy to remember and enter for even operators with cognitive disabilities.

In an embodiment, the shared certificate is provided by server 110 to client device 120. Client device 120 then generates or obtains from a third-party service the graphical scene based on the provided shared certificate, which is presented to an operator of the client device 120 for comparison of the graphical scene rendered on the connecting device display of connecting device 130.

In an embodiment, the validation code is only generated by the connecting device 130 based on private information retained on the connecting device 130. In this embodiment, when the operator obtains the candidate validation code from a screen rendered on the connecting device's display by the connecting device 130 and provides the candidate validation code to server 110, server 110 provides the candidate validation code to connecting device 130 for connecting device 130 to verify that the candidate validation code matches the validation code generated and displayed by connecting device 110. In this way, both server 110 and connecting device 130 both participate in validating the connection 140 between the two devices. Only the connecting device 130 knows what validation code was generated and never provides the validation code over any network connection to any device.

In an embodiment, the shared certificate is derived by connecting device 130 by generating a private key and deriving the shared certificate from the private key and a public key associated with server 110. Connecting device 130 then provides the shared certificate to server 110 during connection negotiations. Server 110 verifies the shared certificate using a private key of server 110 and a public key of connecting device 130.

In an embodiment, the shared certificate is a data structure that is composed dynamically and real time from information included in messages of a key exchange protocol processed between the connecting device and the server during pairing with the shared certificate being combined with a secret kept by the server or the connecting device to determine shared keys resulting from the key exchange protocol.

In an embodiment, server 110 generates and maintains the shared certificate by generating a private key and deriving the shared certificate from the private key and a public key of connecting device 130. The shared certificate is then provided by server 110 to connecting device 130 and connecting device 130 verifies the shared certificate from a public key of server 110 and a private key of connecting device 130.

In an embodiment, both server 110 and connecting device 130 independently generate their own private secrets and each device 110 and 130 independently generate or derive a shared secret that is never transmitted over any network wire using a cryptographical protocol executed over an untrusted network. The shared certificate is then derived by both devices 110 and 130 using an irreversible algorithm; the independently generated shared certificate, which was never transferred over any network wire by devices 110 and 130, is then processed to generate the graphical scenes on each device 110 and 130.

In an embodiment, the graphical scene is generated from the shared certificate using a fixed scene generation algorithm independently by the connecting device 130, server 110, and/or client device 120 (when client device 120 is provided the shared certificate from server 110). The fixed scene generation algorithm can be obtained by connecting device 130 from server 110 in a previously established initial secure connection or can be obtained directly on connecting device 130 through upload during configuration of connecting device or through operator actions to obtain and install the fixed scene generation algorithm.

Device pairing is a cornerstone upon which an integrity of a network relies. Even a brief pairing that is permitted with a MITM attacker can result in long term and continuous network exposure to assets of an enterprise. The attacker installs and propagates malicious programs or spyware in mere seconds, which can go undetected for long periods of time during which confidential information is stolen or used for nefarious purposes. A breached network can result in governmental fines, lawsuits, damages, and loss of customers.

System 100 ensures that device pairings are validated, and secure connections are established with no MITM attackers. System 100 also ensures that operators know the pairing validation workflow is non-reputable by the operator when MITM attacks are subsequently detected by the enterprise, such that the enterprise can be reasonably certain when a MITM attack occurred that a particular operator was likely complicit in the attack; serving as a deterrent to any would-be complicit operators.

System 100 provides a high entropy (degree of randomness or disorder) for a shared certificate between a server 110 and a connecting device 130 that wants to pair with server 110. The shared certificate is represented in a graphical scene along with the validation code (which also provides a degree of randomness or disorder based on the shared certificate). This provides an approach to maintain strong cryptographic protections provided by signed certificates while representing that cryptographic information in human recognizable visible scenes so that a human operator can easily compare two scenes generated for a shared certificate and readily detect differences (because of the high degree of entropy associated with the visual/graphical scenes for two signed certificates that may only differ by a single bit or two bits of information).

The above-noted embodiments and other embodiments are now discussed with reference to FIGS. 2-3.

Figure 2:
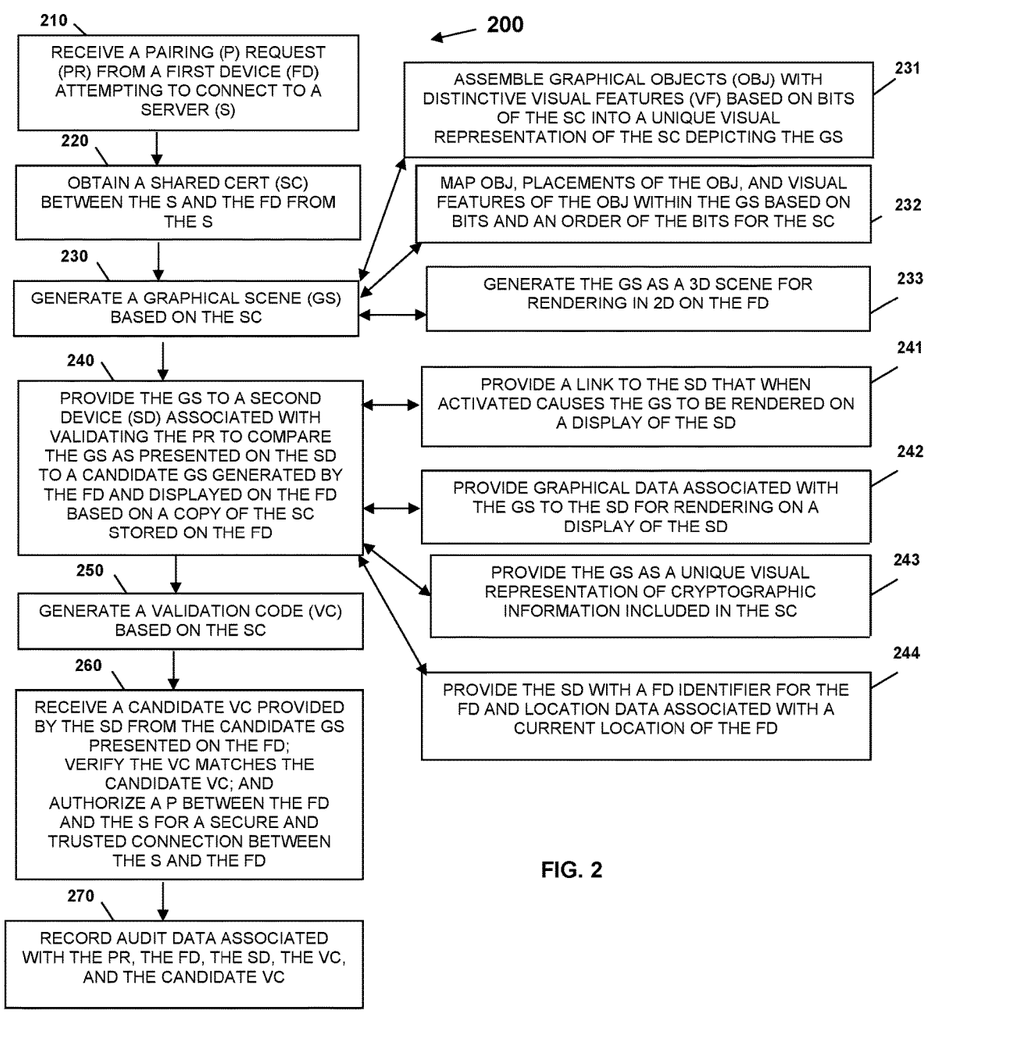
FIG. 2 is a diagram of a method for secure device pairing, according to an example embodiment.

FIG. 2 is a diagram of a method 200 for secure device pairing between two devices, according to an example embodiment. The software module(s) that implements the method 200 is referred to as a "server connection pairing authenticator." The server connection pairing authenticator is implemented as executable instructions programmed and residing within memory and/or a non-transitory computer-readable (processor-readable) storage medium and executed by one or more processors of a device or set of devices. The processor(s) of the device(s) that executes the server connection pairing authenticator are specifically configured and programmed to process the server connection pairing authenticator. The server connection pairing authenticator may have access to one or more network connections during its processing. The network connections can be wired, wireless, or a combination of wired and wireless.

In an embodiment, the server connection pairing authenticator executes on server 110. In an embodiment, the server 110 is one of several servers logically presenting and cooperating as a single server representing a cloud 110 or a cloud processing environment 110.

In an embodiment, the server connection pairing authenticator is one, all, or some combination of 113-115.

At 210, server connection pairing authenticator receives a pairing request from a first device, which is attempting to connect to the server (the device that executes the server connection pairing authenticator).

At 220, the server connection pairing authenticator obtains a shared certificate that is shared between the server and the first device (e.g., connecting device 130 of FIG. 1). This can be a unique signed certificate issued by the server to the first device and comprise cryptographic information.

At 230, the server connection pairing authenticator generates a graphical scene based on the shared certificate.

In an embodiment, at 231, the server connection pairing authenticator assembles graphical objects with distinctive visual features based on bits of the shared certificate into a unique visual representation of the shared certificate depicting the graphical scene.

In an embodiment, at 232, the server connection pairing authenticator maps objects, placements/layouts of the objects within the scene, and unique visual features of the objects within the scene based on bits and an order of the bits for the shared certificate.

In an embodiment, at 233, the server connection pairing authenticator generates the graphical scene as a 3D scene for rendering in 2D on the first device.

At 240, the server connection pairing authenticator provides the graphical scene to a second device (e.g., client device 120) associated with validating the pairing request to compare the graphical scene as presented on the second device to a candidate graphical scene independently generated by the first device and displayed on the first device based on a copy of the shared certificate on the first device.

In an embodiment, at 241, the server connection pairing authenticator provides a link to the second device that when activated causes the graphical scene to be rendered on a display of the second device for visual inspection by an operator of the second device.

In an embodiment, at 242, the server connection pairing authenticator provides graphical data associated with the graphical scene to the second device for rendering on a display of the second device and visual inspection by the operator.

In an embodiment, at 243, the server connection pairing authenticator provides the graphical scene as a unique visual representation of cryptographic information unique to and included within the shared certificate.

In an embodiment, at 244, the server connection pairing authenticator provides the second device with a first device identifier for the first device and location data associated with a current location of the first device.

In an embodiment, at 250, the server connection pairing authenticator generates a validation code based on the shared certificate.

In an embodiment of 250 and at 260, the server connection pairing authenticator receives a candidate validation code code that is provided by an operator of the second device based on the validation code being displayed alongside the graphical scene on the first device and the operator obtaining the validation code from visually inspecting a display of the first device. The server connection pairing authenticator verifies that the candidate validation code matches the validation code generated at 250 and the server connection pairing authenticator authorizes a pairing between the first device and the server for a secure and trusted connection between the server and the first device based on a successful match.

In an embodiment of 260 and at 270, the server connection pairing authenticator records audit data associated with the pairing request, the first device, the second device, an operator of the second device, the generated validation code, and the candidate validation code. This can be used for non-repudiation of any operator that asserts they validated the graphical scenes when a later discovered MITM attacker is discovered and associated with the pairing request to provide evidence that the operator attested to a match with the graphical scene and provided a correct validation code only displayed on the first device.

Figure 3:
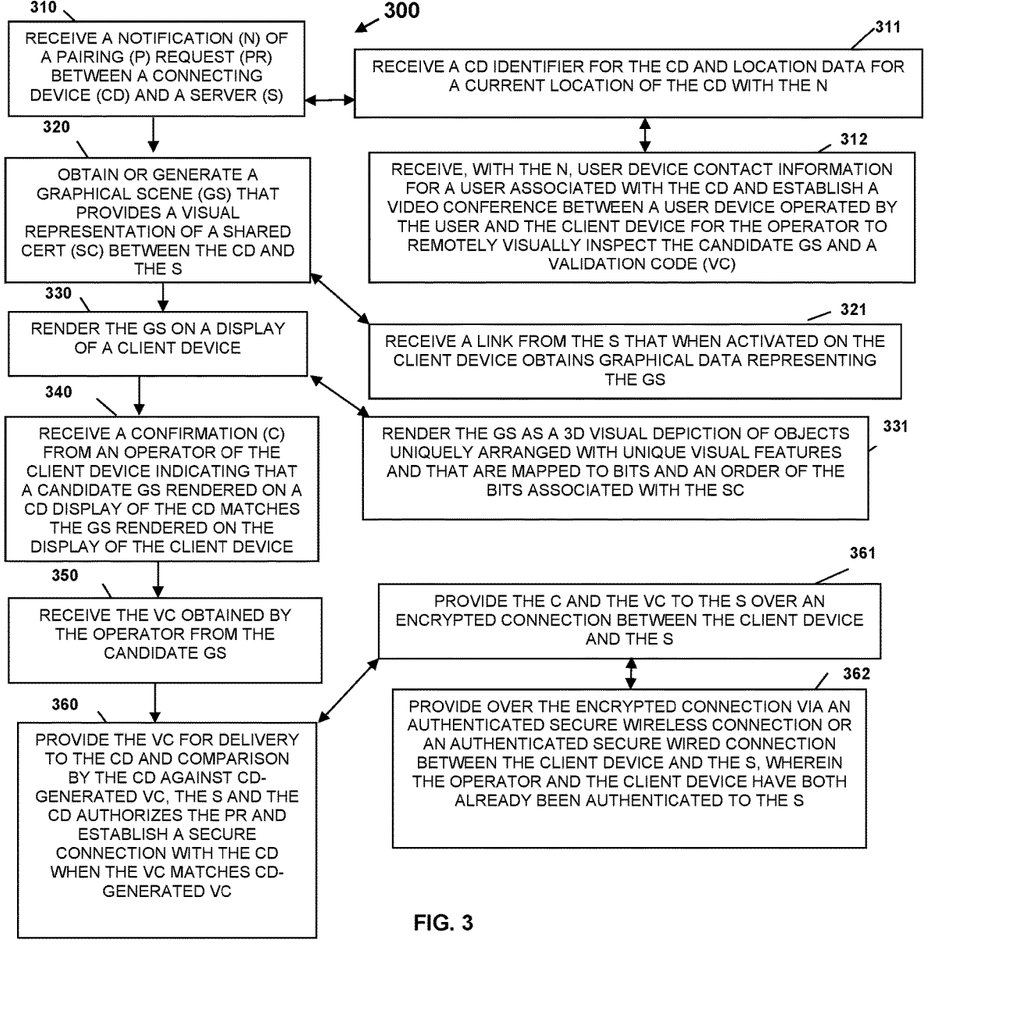
FIG. 3 is a diagram of another method for secure device pairing, according to an example embodiment

FIG. 3 is a diagram of a method 300 for secure device pairing between two devices, according to an example embodiment. The software module(s) that implements the method 300 is referred to as a "connection pairing validation client device manager." The connection pairing validation client device manager is implemented as executable instructions programmed and residing within memory and/or a non-transitory computer-readable (processor-readable) storage medium and executed by one or more processors of a device or set of devices. The processor(s) of the device that executes the connection pairing validation client device manager are specifically configured and programmed to process the connection pairing validation client device manager. The connection pairing validation client device manager may have access to one or more network connections during its processing. The network connections can be wired, wireless, or a combination of wired and wireless.

In an embodiment, the device that executes the connection pairing validation client device manager is connection validation client device 120. In an embodiment, device 120 is a laptop, a desktop, a transaction terminal, a phone, or a wearable processing device.

In an embodiment, the connection pairing validation client device manager is all of, or some combination of, 123-124.

The connection pairing validation client device manager interacts with server 110 in the manners discussed above with system 100 and/or interacts with method 200 of FIG. 2 for purposes of validating and authorizing a connecting device 120 to connection/pair with server 110.

At 310, connection pairing validation client device manager receives a notification of a pairing request between a connecting device and a server.

In an embodiment, at 311, the connection pairing validation client device manager receives a connecting device identifier for the connecting device and location data for a current location of the connecting device with the notification.

In an embodiment of 311 and at 312, the connection pairing validation client device manager receives, with the notification, user device contact information for a user associated with the connecting device. The connection pairing validation client device manager establishes a video conference between a user device operated by the user and the client device for the operator of the client device to remotely and visually inspect a candidate graphical scene (see below at 340) against the graphical scene (see below at 320) and obtain a validation code (see below at 350).

At 320, the connection pairing validation client device manager obtains a graphical scene that provides a visual representation of a shared certificate between the connecting device and the server. At 320, the connection pairing validation client device manager may also generate the graphical scene based on the shared certificate being provided by the server. So, the graphical scene can be obtained from the server or can be generated independently by the connection pairing validation client device manager when the shared certificate is provided by the server.

In an embodiment, at 321, the connection pairing validation client device manager receives a link from the server that when activated on the client device by the operator of the client device obtains graphical data representing the graphical scene.

At 330, the connection pairing validation client device manager renders the graphical scene on a display of the client device for visual inspection by the operator of the client device.

In an embodiment, at 331, the connection pairing validation client device manager renders the graphical scene as a 3D visual depiction of objects that are uniquely arranged with unique visual features and that are mapped to bits and an order of the bits associated with the shared certificate.

At 340, the connection pairing validation client device manager receives a confirmation from the operator of the client device indicating that a candidate graphical scene rendered on a connecting device display of the connecting device matches the graphical scene rendered on the display of the client device.

At 350, the connection pairing validation client device manager receives a validation code entered by the operator and which the operator visually obtained from the candidate graphical scene.

At 360, the connection pairing validation client device manager provides the validation code to the server for delivery by the server to the connecting device. The connecting device compares the validation code against a client device generated validation code. The server and the client device authorize the pairing request and establish a secure connection with one another when the validation code matches the client device generated validation code.

In an embodiment, at 361, the connection pairing validation client device manager provides the confirmation and the validation code entered by the operator to the server over an encrypted connection 150 between the client device 120 and the server 110.

In an embodiment of 361 and at 362, the connection pairing validation client device manager provides the confirmation and the validation code to the server over the encrypted connection via an authenticated secure wireless connection 150 or via an authenticated secure wired connection 150. Both the operator of the client device 120 and the client device 120 have both already been authenticated to the server.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
  receiving, by a server, a pairing request from a connecting device attempting to connect to the server;
  obtaining, by the server, a shared certificate between the server and the connecting device;
  generating, by the server, a graphical scene based on the shared certificate;
  generating, by the server, a validation code based on the shared certificate or obtaining, by the server, the validation code from the connection device;
  providing, by the server, the graphical scene to a client device associated with validating the pairing request to compare the graphical scene as presented on the client device to a candidate graphical scene generated by the connecting device and displayed on the connecting device based on a copy of the shared certificate stored on the connecting device;
  receiving, by the client device, a notification from the server of the pairing request associated with the connecting device;
  obtaining, by the client device, the graphical scene from the server or generating the graphical scene from the shared certificate obtained from the server;
  rendering, by the client device, the graphical scene on a client display of the client device for visual inspection by an operator and for visual comparison of the operator with the candidate graphical scene rendered on a connecting device display of the connection device;
  receiving, by the client device, a confirmation provided by the operator;
  receiving, by the client device, a candidate validation code provided by the operator;
  sending, by the client device, the confirmation and the candidate validation code to the server for verification and authorization of the pairing request;
  receiving, by the server, the confirmation from the client device indicating that the graphical visual scene matches the candidate graphical scene;
  receiving, by the server, the candidate validation code;
  verifying, by the server, the candidate validation code matches the validation code or providing the candidate validation code to the connecting device to verify the candidate validation code against the validation code; and
  authorizing, by the server, the connecting device to establish a secure and trusted connection with the server based on receipt of the confirmation and based on verification that the candidate validation code matches the validation code.

2. The method of claim 1, wherein generating, by the server, the validation code further includes generating, by the server, the validation code based on private data of the connecting device.

3. The method of claim 2, wherein receiving, by the server, the candidate validation code further includes
  receiving the candidate validation code that is provided by the operator of the client device based on the validation code being displayed alongside the graphical scene on the connecting device and the operator obtaining the validation code from visually inspecting the connecting device display of the connecting device or the operator obtaining the graphical scene and the validation code from a direct sensory interaction with the connecting device.

4. The method of claim 1 further comprising:
  recording, by the server, audit data associated with the pairing request, the connecting device, the client device, the validation code, and the candidate validation code.

5. The method of claim 1, wherein generating, by the server, the graphical scene further includes assembling graphical objects with distinctive visual features based on bits of the shared certificate into a unique visual representation of the shared certificate depicted within the graphical scene.

6. The method of claim 1, wherein generating, by the server, the graphical scene further includes mapping objects, placements of the objects, and visual features of the objects within the graphical scene based on bits and an order of the bits for the shared certificate.

7. The method of claim 1, wherein generating, by the server, the graphical scene further includes generating the graphical scene as a three-dimensional scene for rendering in two dimensions on the client device.

8. The method of claim 1, wherein providing, by the server, the graphical scene further includes provide a link to the client device that when activated on the client second device causes the graphical scene to be rendered on the client display of the client device.

9. The method of claim 1, wherein providing, by the server, the graphical scene further includes providing graphical data associated with the graphical scene to the client device for rendering on the client display of the client device.

10. The method of claim 1, wherein providing, by the server, the graphical scene further includes providing the graphical scene as a unique visual representation of cryptographic information included in the shared certificate.

11. The method of claim 10, wherein providing, by the server, the graphical scene further includes providing the client device with a connecting device identifier for the connecting device and location data associated with a current location of the connecting device.

12. A method, comprising:
  receiving, by a server, a pairing request from a connection device attempting to pair with the server;
  obtaining, by the server, a shared certificate on the server that is shared with the connecting device;
  generating, by the server, a graphical scene that is unique to and based on the shared certificate;
  generating, by the server, a validation code based on the shared certificate or obtaining the validation code from the connecting device;
  providing, by the server, the notification and the graphical scene or data used to independently generate the graphical scene to a client device;

receiving, by a client device, the notification of the pairing request;

generating using the data or obtaining, by the client device, the graphical scene that provides a visual representation of the shared certificate between the connecting device and the server;

rendering, by the client device, the graphical scene on a client display of the client device;

receiving, by the client device, a confirmation from an operator of the client device indicating that a candidate graphical scene rendered on a connecting device display of the connecting device matches the graphical scene rendered on the client display of the client device;

receiving, by the client device, a candidate validation code obtained by the operator that purportedly was obtained by the operator from a screen rendered on the connecting device display of the connecting device candidate;

providing, by the client device, the confirmation and the candidate validation code to the server;

verifying, by the server, the confirmation and that the candidate validation code matches the validation code; and authorizing, by the server, the connecting device to establish a secure and trusted connection with the server based on receipt of the confirmation and based on verification that the candidate validation code matches the validation code.

13. The method of claim 12, wherein receiving, by the client device, the notification further includes receiving a connecting device identifier for the connection device and location data for a current location of the connecting device with the notification.

14. The method of claim 13, wherein receiving, by the client device, the notification further includes receiving, with the notification, user device contact information for a user associated with the connecting device and establishing a video conference between a user device operated by the user and the client device that allows the operator to remotely visually inspect the connecting device display for the candidate graphical scene and the validation code.

15. The method of claim 12, wherein generating using the data or obtaining, by the client device, further includes receiving the data comprising a link from the server that when activated on the client device obtains graphical data representing the graphical scene.

16. The method of claim 12, wherein rendering, by the client device, further includes rendering the graphical scene as a three-dimension visual depiction of objects that are uniquely arranged with unique visual features and that are uniquely mapped to bits and an order of the bits that are associated with the shared certificate or that are homogeneously derived from the shared certificate using a pseudo-random generator.

17. The method of claim 12, wherein providing, by the client device, further includes providing the confirmation and the validation code to the server over an encrypted connection between the client device and the server.

18. The method of claim 17, wherein providing, by the client device, further includes providing the confirmation and the validation code over the encrypted connection via an authenticated secure wireless connection or an authenticated secure wired connection between the client device and the server, wherein the operator and the client device have both independently authenticated to the server.

19. A system, comprising:
a server comprising at least one processor and a non-transitory computer-readable storage medium;
the non-transitory computer-readable storage medium comprises server executable instructions;
a client device comprising at least one client processor and a client non-transitory computer-readable storage medium;
the client non-transitory computer-readable medium comprises client executable instructions;
the server executable instructions when executed by the at least one processor from the non-transitory computer-readable storage medium cause the at least one processor to perform operations comprising:
receiving a pairing request from a connecting device attempting to pair with the server;
obtaining a shared certificate on the server that is shared with the connecting device;
generating a graphical visual scene that is unique to and based on the shared certificate;
generating a validation code based on the shared certificate or obtaining the validation code from the connecting device;
providing the graphical visual scene to the client device;
receiving a confirmation from the client device indicating the graphical visual scene matches a candidate graphical visual scene rendered on a connecting device display of the connecting device;
receiving a candidate validation code obtained from an operator of the client device from the candidate graphical visual scene as displayed by the connecting device on the connecting device display;
verifying the candidate validation code matches the validation code or providing the candidate validation code to the connecting device for the connecting device to verify the candidate validation code against the validation code; and
authorizing the connecting device to establish a secure and trusted connection with the server based on receipt of the confirmation and based on verification that the candidate validation code matches the validation code;
the client executable instructions when executed by the at least one client processor from the client non-transitory computer-readable storage medium cause the at least one client processor to perform second operations comprising:
receiving a notification from the server of the pairing request associated with the connecting device;
obtaining the graphical visual scene from the server or generating the graphical visual scene from the shared certificate obtained from the server;
rendering the graphical visual scene on a client display of the client device for visual inspection by the operator and for visual comparison of the operator with the candidate graphical visual scene rendered on the connecting device display of the connecting device;
receiving the confirmation provided by the operator;
receiving the candidate validation code provided by the operator;
sending the confirmation and the candidate validation code to the server for verification and authorization of the pairing request.

20. The system of claim 19, wherein the connecting device is an Automated Teller Machine (ATM), a Self-Service Terminal (SST), a Point-Of-Sale (POS) terminal, or a kiosk, and wherein the shared certificate is a unique signed digital certificate issued to the connecting device by the server or wherein the shared certificate is a data structure that is composed dynamically and in real time from information included in messages of a key exchange protocol processed between the connecting device and the server during pairing with the shared certificate being combined with a secret kept by the server or the connecting device to determine a shared key resulting from the key exchange protocol.

* * * * *